Jan. 9, 1951     G. E. DATH     2,537,261
FRICTION SHOCK ABSORBER FOR TRUCK
SPRINGS OF RAILWAY CARS
Filed Jan. 15, 1949

Inventor:
George E. Dath.
By Henry Fuchs.
Atty.

Patented Jan. 9, 1951

2,537,261

UNITED STATES PATENT OFFICE 2,537,261

FRICTION SHOCK ABSORBER FOR TRUCK SPRINGS OF RAILWAY CARS

George E. Dath, Mokena, Ill., assignor to W. H. Miner, Inc., Chicago, Ill., a corporation of Delaware Application January 15, 1949, Serial No. 71,151

7 Claims. (Cl. 267—9)

1

This invention relates to improvements in friction shock absorbers for railway cars, and more particularly for snubbing or dampening the action of the truck springs.

One object of the invention is to provide a friction shock absorber comprising follower members movable toward and away from each other, friction members projecting from said follower members and formed integral therewith, and a coil spring surrounding said friction members and bearing at opposite ends on the follower members, wherein the friction members of one follower member are intercalated with the friction members of the other follower, and wherein resilient means is provided for pressing the friction members into tight frictional engagement with each other.

A further object of the invention is to provide a friction shock absorber of the character indicated, comprising intercalated friction members arranged in two opposed sets, with the members of each set rigidly connected to each other, and spring means for opposing relative lengthwise movement of the friction members of said opposed sets toward each other, wherein the friction members of said sets are pressed into tight frictional engagement with each other by spreading means interposed and reacting between one of the members of one set and a member of the other set and having sliding frictional contact with said last named members.

A more specific object of the invention is to provide a friction shock absorber, as set forth in the preceding paragraph, wherein the spreading means comprises a pair of friction plates and a resilient element under lateral compression between said plates.

Other objects of the invention will more clearly appear from the description and claims hereinafter following.

Figure 1:
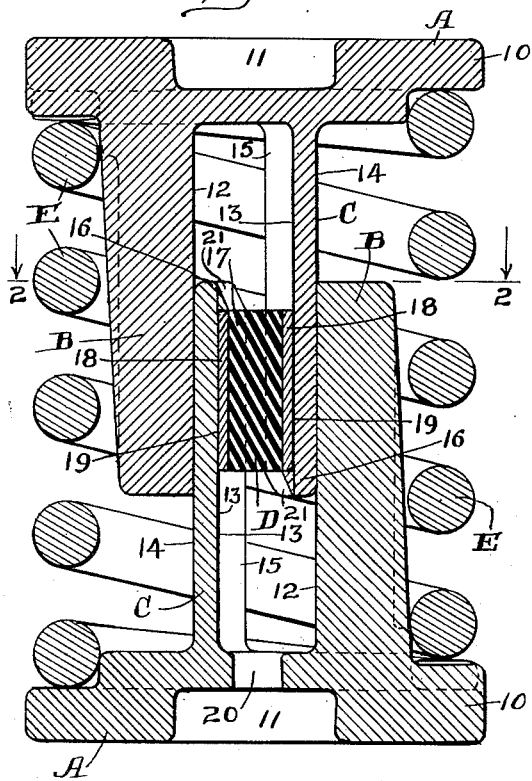
Figure 2:
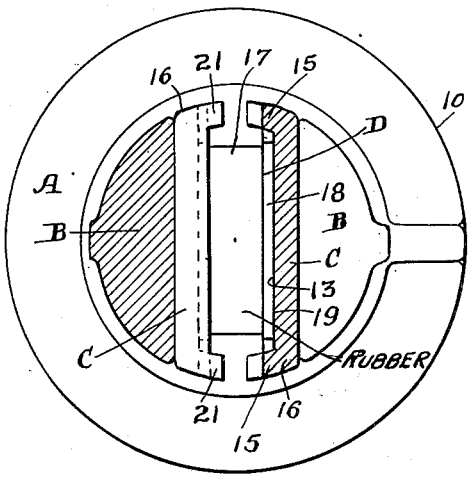
Figure 3:
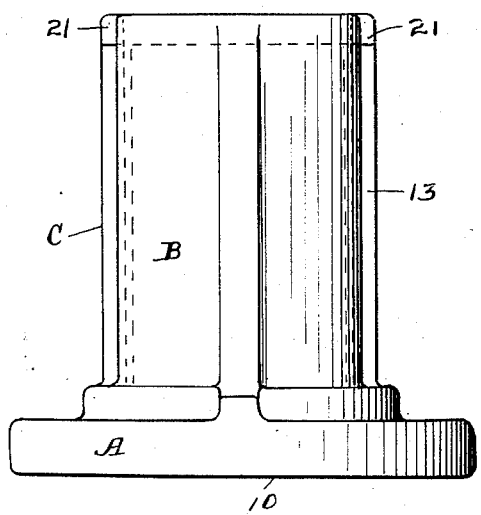

In the accompanying drawing forming a part of this specification, Figure 1 is a transverse, vertical sectional view of my improved shock absorber. Figure 2 is a transverse, horizontal sectional view, corresponding substantially to the line 2—2 of Figure 1, with the spring omitted. Figure 3 is a side elevational view of the bottom friction members illustrated in Figure 1, looking from right to left in said figure.

My improved shock absorber, as illustrated in the drawing, comprises broadly top and bottom followers A—A; top and bottom sets of friction members, each set comprising two members B and C; a combined spreading and friction element D between the members C—C of the top

2 and bottom sets; and a coil spring E surrounding the friction members and bearing at its top and bottom ends on the top and bottom followers, respectively.

The top and bottom followers A—A are identical. Each follower A is in the form of a relatively heavy disc having a laterally projecting, annular flange 10 of lesser thickness than the central portion of the disc. Each follower A is provided with a central opening or seat 11 at its outer side adapted to accommodate the usual centering projection of the corresponding spring follower plate of a cluster of truck springs.

The top and bottom friction members B—C and B—C are also identical. Each friction member B is in the form of a relatively heavy plate or post having a longitudinally extending flat friction surface 12 on the inner side thereof. Each friction member C is in the form of a plate having lengthwise extending flat friction surfaces 13 and 14 on opposite sides thereof, that is, on the inner and outer sides. Each platelike member C has inwardly projecting, vertical flanges 15—15 extending along opposite side edges thereof, and a transversely extending, laterally projecting, horizontal, riblike flange 16 on its inner side at the outer end thereof, the riblike flange 16 being of lesser width than the flanges 15 and 15 and forming a stop lug.

The friction members B and C are formed integral with the corresponding follower A, the members B and C of the bottom follower upstanding therefrom and the members of the top follower depending from the same.

As shown most clearly in Figure 1, the members B and C of each follower are spaced apart laterally, and the member C of the bottom follower is accommodated between the members B and C of the top follower, while the member C of the top follower is accommodated between the members B and C of the bottom follower, the members C—C of the top and bottom followers being spaced laterally with respect to each other and having sliding engagement on their outer friction surfaces 14—14 with the friction surfaces of the friction members B—B of the bottom and top followers, respectively. As will be evident upon reference to Figure 1, the two friction elements comprising, on the one hand, the lower follower A and the friction members B and C, and on the other hand, the top follower A and the top friction members B and C, are identical in design, but reversely arranged, that is, the upper friction element is inverted with respect to the lower friction element and has the friction member B at the left hand side thereof, while the lower element has the friction member B at the right hand side.

The combined spreading and friction element D is interposed between the friction members C—C and comprises a rubber block or pad 17 and flat plates or shoes 18—18 vulcanized to the opposite sides of the rubber pad. The plates or shoes 18—18 present lengthwise extending, flat friction surfaces 19—19 on their outer sides which bear on the friction surfaces 12—12 of the members C—C. In the assembled condition of the shock absorber, the pad 17 is under initial compression, thus firmly pressing the plates 18—18 against the friction members C—C and forcing the latter, in turn, against the friction members B—B.

The spring E, which is in the form of a single, relatively heavy, helical coil, surrounds the top and bottom friction members B—C and B—C and has its top and bottom ends bearing on the flanges 10—10 of the top and bottom followers A—A, respectively. The spring E is preferably under initial compression and yieldingly opposes relative approach of the followers A—A.

Vertical separation of the parts of the mechanism is limited by engagement of the riblike flanges 16—16 of the top and bottom friction members C—C with the combined spreading and friction element D, the rib of the bottom member C engaging the upper end of the plate 18 at the left hand side of the element D and the rib at the lower end of the top friction member C engaging the lower end of the plate 18 at the right hand side of said element, as seen in Figure 1.

In assembling the mechanism, the spring E is first placed in position over the bottom friction members B and C, resting on the flange 10 of the bottom follower A. The combined spreading and friction element D is then placed within the space between the members B and C of the bottom set and brought to a position behind the rib 16 of the corresponding friction member C, that is, the position shown in Figure 1. In this position, the element D is supported by a suitable tool, such as a bar, not shown, inserted through an opening 20 provided for that purpose in the bottom follower A. After the element D has been so placed, between the bottom members B and C and supported by the tool hereinbefore referred to, the top friction members B and C are applied, the same being inserted within the spring E through the upper end thereof and engaged with the lower members B and C, the top member C being engaged between the bottom members B and C with the top member C alongside the bottom member B and the top member B alongside the bottom member C. The top follower A is then forced downwardly, thereby wedging the top member C between the element D and the lower member B, placing the rubber pad 17 under lateral compression. In order to facilitate this wedging engagement, the outer ends of the members C—C are beveled on their inner sides at the inner ends, as indicated at 21—21. The follower A is depressed until the top friction member C reaches the position shown in Figure 1 and the rib 16 thereof snaps under the plate 18 at the right hand side of the element D, thereby limiting separation of the followers A—A after the pressure is removed from the top follower and holding the mechanism assembled, upward displacement of the element D being prevented by the rib 16 of the bottom member C.

My improved shock absorber preferably replaces one or more of the spring units of a truck spring cluster of a railway car, being interposed between the usual top and bottom spring follower plates which cooperate with the cluster.

The operation of the improved shock absorber is as follows: Upon the spring cluster of the truck of a railway car being compressed between the follower plates of the cluster, my improved shock absorber, which is disposed between said follower plates, is compressed therewith, thereby forcing the top follower A and the top friction members B and C downwardly toward the bottom members B and C, against the resistance of the spring E. Frictional resistance is thus provided between the top and bottom members B and C on the cooperating friction surfaces thereof, and between the members C—C and the element D, which floats between the members C—C, the element D slipping on either one or both of the members C. The required snubbing action is thus developed during both compression and recoil of the truck springs, the spring E returning the members B—C and B—C to the normal position shown in Figure 1 during expansion of the spring E, and the element D being centered by the ribs 16—16 on the members C—C.

I claim:

1. In a friction shock absorber, the combination with relatively lengthwise movable pairs of friction members having cooperating friction surfaces engaged with each other, the members of each pair being rigidly connected to each other; of a spreading element interposed between one of the members of one of said pairs and one of the members of the other pair for forcing said last named members laterally apart against the remaining members of said pairs, said spreading element having lengthwise sliding frictional engagement with the members between which said spreading element is interposed; and spring means having shouldered engagement with said pairs of members respectively for yieldingly opposing relative lengthwise movement of said pairs of members toward each other.

2. In a friction shock absorber, the combination with relatively lengthwise movable pairs of friction members having cooperating friction surfaces engaged with each other, the members of each pair being rigidly connected to each other; of a spreading element including a resilient member under lateral compression and friction plates embracing said resilient member at opposite sides, said plates having lengthwise sliding engagement with one of the friction members of one of said pairs and one of the friction members of the other of said pairs; and spring means having shouldered engagement at opposite ends with said pairs of members respectively for yieldingly opposing relative lengthwise movement of said pairs of members toward each other.

3. In a friction shock absorber, the combination with relatively lengthwise movable pairs of friction members having cooperating friction surfaces engaged with each other, the members of each pair being rigidly connected to each other; of a spreading element including a rubber block under lateral compression and friction plates secured to opposite sides of said block; said spreading element being interposed between one of the members of one of said pairs and one of the members of the other of said pairs, with the plates thereof in sliding frictional engagement with said last named members; and spring means having shouldered engagement at opposite ends with said pairs of members respectively for yieldingly opposing relative lengthwise movement of said pairs of members toward each other.

4. In a friction shock absorber, the combination with a pair of followers movable toward and away from each other; of a pair of laterally spaced, longitudinally extending, inner and outer friction members rigid with each follower, the inner member of each pair having sliding engagement with the outer member of the other pair; a spreading element interposed between the inner members of said pairs, said element having lengthwise sliding engagement with said inner members of said pairs; and spring means interposed between said followers and yieldingly opposing relative approach of the same.

5. In a friction shock absorber, the combination with a pair of followers movable toward and away from each other; of a pair of laterally spaced, longitudinally extending, inner and outer friction members rigid with each follower, the inner member of each pair having sliding engagement with the outer member of the other pair; a spreading element interposed between the inner members of said pairs, said element including a resilient member under lateral compression, and a pair of plates embracing said resilient member at opposite sides, said plates having lengthwise sliding engagement with said inner members of said pairs; and spring means interposed between said followers and yieldingly opposing relative approach of the same.

6. In a friction shock absorber, the combination with a pair of followers movable toward and away from each other; of a lengthwise extending friction post rigid with each follower, said post having a lengthwise extending friction surface on the inner side thereof; a lengthwise extending friction member projecting from each follower, said member of each follower being spaced laterally from the post of said follower, each of said members having lengthwise extending friction surfaces on the inner and outer sides thereof, said friction member of each follower having the friction surface on the outer side thereof in sliding frictional engagement with the friction surface of the post of the other follower; a resilient spreading member interposed between the friction members of said followers and having sliding frictional engagement with the friction surfaces on the inner sides of said members; and spring means bearing at opposite ends on said followers to yieldingly oppose movement of said followers toward each other.

7. In a friction shock absorber, the combination with a pair of followers movable toward and away from each other; of a lengthwise extending friction post rigid with each follower, said post having a lengthwise extending friction surface on the inner side thereof; a lengthwise extending friction member projecting from each follower, said member of each follower being spaced laterally from the post of said follower, each of said members having lengthwise extending friction surfaces on the inner and outer sides thereof, said friction member of each follower having the friction surface on the outer side thereof in sliding frictional engagement with the friction surface of the post of the other follower; a resilient spreading member interposed between the friction members of said followers, said spreading member including a pair of friction plates slidingly engaged with the friction surfaces on the inner sides of said friction members, and a resilient element under lateral compression between said plates of said pair; and spring means bearing on said followers respectively to yieldingly oppose movement of said followers toward each other.

GEORGE E. DATH.

REFERENCES CITED

The following references are of record in the file of this patent:

UNITED STATES PATENTS

| Number | Name | Date |
|---|---|---|
| 488,474 | Gibbs | Dec. 20, 1892 |
| 1,884,520 | Barrows | Oct. 25, 1932 |
| 2,306,395 | Cottrell | Dec. 29, 1942 |
| 2,416,691 | Haseltine | Mar. 4, 1947 |